United States Patent
Kodama

(10) Patent No.: US 8,111,430 B2
(45) Date of Patent: Feb. 7, 2012

(54) COLOR CONVERSION APPARATUS AND METHOD

(75) Inventor: Yoichi Kodama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 11/530,312

(22) Filed: Sep. 8, 2006

(65) Prior Publication Data

US 2007/0058184 A1 Mar. 15, 2007

(30) Foreign Application Priority Data

Sep. 13, 2005 (JP) ................................ 2005-265513

(51) Int. Cl.
*H04N 1/40* (2006.01)
*H04N 1/46* (2006.01)
*G06K 9/00* (2006.01)

(52) U.S. Cl. ........ 358/3.24; 358/504; 382/167; 708/290

(58) Field of Classification Search .................... 358/1.9, 358/3.23, 3.24, 504, 518; 382/162, 167; 345/589, 600; 708/290

See application file for complete search history.

(56) References Cited

U.S. PATENT DOCUMENTS

| 5,339,365 | A | | 8/1994 | Kawai et al. | |
|---|---|---|---|---|---|
| 5,625,378 | A | * | 4/1997 | Wan et al. | 345/600 |
| 5,930,388 | A | | 7/1999 | Murakami | |
| 6,778,183 | B1 | * | 8/2004 | Nair et al. | 345/589 |
| 6,919,924 | B1 | * | 7/2005 | Terashita | 348/223.1 |
| 2003/0072016 | A1 | * | 4/2003 | Dalrymple et al. | 358/1.9 |
| 2005/0094169 | A1 | * | 5/2005 | Berns et al. | 358/1.9 |
| 2006/0041609 | A1 | * | 2/2006 | Pellar | 708/290 |

FOREIGN PATENT DOCUMENTS

| JP | 03-088577 A | 4/1991 |
|---|---|---|
| JP | 10-136216 A | 5/1998 |
| JP | 2000-261684 A | 9/2000 |
| JP | 2002-281338 A | 9/2002 |

* cited by examiner

*Primary Examiner* — James A Thompson
(74) *Attorney, Agent, or Firm* — Canon U.S.A., Inc. IP Division

(57) ABSTRACT

A color conversion apparatus includes a plurality of color conversion units configured to perform color conversion using a conversion table with different algorithms, a weighting unit configured to set weightings applied to the plurality of color conversion units, and a mixing unit configured to mix a plurality of color conversion results obtained by the plurality of color conversion units using the weightings calculated by the weighting unit.

11 Claims, 20 Drawing Sheets

FIG.7

| RGB_R | RGB_G | RGB_B | LAB_L | LAB_A | LAB_B |
|---|---|---|---|---|---|
| 0 | 0 | 0 | 7 | -0.2 | -8.3 |
| 0 | 0 | 64 | 8.5 | 9.2 | -26.7 |
| 0 | 0 | 128 | 9.9 | 21.1 | -41.4 |
| 0 | 0 | 192 | 11.2 | 31.8 | -53.2 |
| 0 | 0 | 255 | 12.7 | 43.4 | -65.2 |
| 0 | 64 | 0 | 14.9 | -21.4 | -0.6 |
| 0 | 64 | 64 | 16.7 | -15.4 | -22.9 |
| 0 | 64 | 128 | 19.9 | -1 | -42.5 |
| . . . | | | | | |
| . . . | | | | | |
| . . . | | | | | |
| 255 | 255 | 192 | 88.5 | -5.8 | 31.1 |
| 255 | 255 | 255 | 90.6 | 2.3 | -3 |

FIG.8

```
...
RATE="GRAY"
...
FORMAT_START
RGB_R  RGB_G  RGB_B  XYZ_X  XYZ_Y  XYZ_Z
FORMAT_END
DATA_START
0   0   0    3.111   2.343   3.728
0   0   32   4.239   4.230   5.238
...
...
DATA_END
```

FIG.9

```
...
RATE_0_0_0=1
RATE_0_0_32=0
...
FORMAT_START
RGB_R  RGB_G  RGB_B  XYZ_X  XYZ_Y  XYZ_Z
FORMAT_END
DATA_START
0   0   0    3.111   2.343   3.728
0   0   32   4.239   4.230   5.238
...
...
DATA_END
```

FIG.12

| RGB_R | RGB_G | RGB_B | RATE_1 | RATE_2 |
|---|---|---|---|---|
| 0 | 0 | 0 | 1 | 0 |
| 0 | 0 | 16 | 1 | 0 |
| 0 | 0 | 32 | 1 | 0 |
| 0 | 0 | 48 | 1 | 0 |
| 0 | 0 | 64 | 1 | 0 |
| 0 | 0 | 80 | 1 | 0 |
| . . . | | | | |
| 0 | 48 | 0 | 0.5 | 0.5 |
| 0 | 48 | 16 | 0.5 | 0.5 |
| . . . | | | | |
| 0 | 64 | 0 | 0 | 1 |
| 0 | 64 | 16 | 0 | 1 |
| . . . | | | | |
| 32 | 16 | 0 | 1 | 0 |
| 32 | 16 | 16 | 1 | 0 |
| . . . | | | | |
| 48 | 48 | 0 | 0.5 | 0.5 |
| 48 | 48 | 16 | 0.5 | 0.5 |
| . . . | | | | |
| 64 | 64 | 0 | 0 | 1 |
| 64 | 64 | 16 | 0 | 1 |
| . . . | | | | |
| 64 | 64 | 240 | 0 | 1 |
| 64 | 64 | 255 | 0 | 1 |
| . . . | | | | |
| 80 | 0 | 0 | 0 | 1 |
| 80 | 0 | 16 | 0 | 1 |
| . . . | | | | |
| 255 | 255 | 240 | 0 | 1 |
| 255 | 255 | 255 | 0 | 1 |

FIG.16

| RGB_R | RGB_G | RGB_B | LAB_L | LAB_A | LAB_B | RATE |
|---|---|---|---|---|---|---|
| 0 | 0 | 0 | 14.4 | 0.0 | 1.2 | 1 |
| 0 | 0 | 32 | 16.4 | 4.0 | -9.2 | 0 |
| 0 | 0 | 64 | 18.1 | 4.4 | -18.6 | 0 |
| . . . | | | | | | |
| 32 | 32 | 0 | 26.4 | -4.0 | 11.2 | 0 |
| 32 | 32 | 32 | 25.4 | -1.0 | 1.0 | 1 |
| . . . | | | | | | |
| 64 | 64 | 64 | 42.0 | 2.8 | -7.3 | 1 |
| 64 | 64 | 96 | 41.1 | 5.5 | -23.1 | 0 |
| . . . | | | | | | |
| 255 | 255 | 224 | 90.4 | -1.2 | 7.6 | 0 |
| 255 | 255 | 255 | 90.6 | 2.3 | -3.0 | 1 |

FIG.17

| RGB_R | RGB_G | RGB_B | RATE_1 | RATE_2 | RATE_3 |
|---|---|---|---|---|---|
| 0 | 0 | 0 | 1 | 0 | 0 |
| 0 | 0 | 16 | 0 | 1 | 0 |
| 0 | 0 | 32 | 0 | 1 | 0 |
| . . . | | | | | |
| 0 | 0 | 224 | 0 | 1 | |
| 0 | 0 | 240 | 0 | 0.5 | 0.5 |
| 0 | 0 | 255 | 0 | 0 | 1 |
| . . . | | | | | |
| 255 | 255 | 240 | 0 | 1 | 0 |
| 255 | 255 | 255 | 1 | 0 | 0 |

FIG.18

| RGB_R | RGB_G | RGB_B | RATE_1_L | RATE_1_A | RATE_1_B | RATE_2_L | RATE_2_A | RATE_2_B |
|---|---|---|---|---|---|---|---|---|
| 0 | 0 | 0 | 0 | 1 | 1 | 1 | 0 | 0 |
| 0 | 0 | 32 | 0 | 0 | 0 | 1 | 1 | 1 |
| ... | ... | ... | ... | ... | ... | ... | ... | ... |
| 32 | 32 | 0 | 0 | 0 | 0 | 1 | 1 | 1 |
| 32 | 32 | 32 | 0 | 1 | 1 | 1 | 0 | 0 |
| ... | ... | ... | ... | ... | ... | ... | ... | ... |
| 64 | 64 | 64 | 0 | 1 | 1 | 1 | 0 | 0 |
| 64 | 64 | 96 | 0 | 0 | 0 | 1 | 1 | 1 |
| ... | ... | ... | ... | ... | ... | ... | ... | ... |
| 255 | 255 | 240 | 0 | 0 | 0 | 1 | 1 | 1 |
| 255 | 255 | 255 | 0 | 1 | 1 | 1 | 0 | 0 |

FIG.19

| RGB_R | RGB_G | RGB_B | LAB_L | LAB_A | LAB_B |
|---|---|---|---|---|---|
| 0 | 0 | 0 | 14.4 | 0.0 | 1.2 |
| 0 | 0 | 32 | 16.4 | 4.0 | -9.2 |
| 0 | 0 | 64 | 18.1 | 4.4 | -18.6 |
| . . . | . . . | . . . | . . . | . . . | . . . |
| 0 | 32 | 0 | 27.9 | -3.2 | 2.7 |
| 0 | 32 | 32 | 25.9 | 1.0 | -7.7 |
| 0 | 32 | 64 | 22.1 | 6.7 | -14.9 |
| . . . | . . . | . . . | . . . | . . . | . . . |
| 255 | 255 | 224 | 90.4 | -1.2 | 7.6 |
| 255 | 255 | 255 | 90.6 | 2.3 | -3.0 |

FIG.20

| RGB_R | RGB_G | RGB_B | LAB_L | LAB_A | LAB_B |
|---|---|---|---|---|---|
| 0 | 0 | 0 | 14.4 | 0.0 | 1.2 |
| 0 | 0 | 16 | 15.4 | 2.2 | -4.5 |
| . . . | | | | | |
| 0 | 0 | 255 | 31.6 | 23.5 | -50.3 |
| . . . | | | | | |
| . . . | | | | | |
| . . . | | | | | |
| 0 | 16 | 0 | 25.4 | -8.1 | 2.0 |
| 0 | 16 | 16 | 27.9 | -6.0 | 2.3 |
| . . . | | | | | |
| 0 | 16 | 255 | 35.3 | 23.1 | -53.9 |
| . . . | | | | | |
| . . . | | | | | |
| . . . | | | | | |
| 64 | 64 | 0 | 45.0 | -9.4 | 26.1 |
| 64 | 64 | 16 | 43.1 | -6.7 | 14.5 |
| . . . | | | | | |
| 64 | 64 | 240 | 39.1 | 7.2 | -39.8 |
| 64 | 64 | 255 | 39.0 | 7.4 | -41.2 |

COLOR CONVERSION APPARATUS AND METHOD

BACKGROUND OF THE INVENTION

1. Field of the Invention

The present invention relates to color conversion using a table.

2. Description of the Related Art

Today, with development of computers, digital image data is very commonly distributed. Color matching is known as a technique of converting input image data to color signals suitable for devices, which are to be used, by taking differences in color representation among the devices into account.

A conventional color matching method is described below by referring to a conceptual diagram illustrated in FIG. 21. Input data (RGB-data) is converted by an input profile 101 into XYZ data in a device-independent color space. Because an output device cannot reproduce colors that are outside a color gamut of the output device, gamut mapping is performed on the XYZ data, into which the input data has been converted, to map the XYZ data onto color data which is within the color gamut of the output device. The data, on which the gamut mapping is performed, is converted from the device-independent color space into CMYK data of an output-device-dependent color space.

In color matching, a reference white point and ambient light are fixed. For example, according to a profile specified by the International Color Consortium (ICC), Profile Connection Space (PCS) includes XYZ values or Lab values based on D50 reference. Therefore, correct color reproduction is ensured when an input original document and a print-out are viewed under an illuminant of D50 reference. Under an illuminant based on another reference, correct color reproduction is not assured.

Japanese Patent Application Laid-Open No. 2002-281338 discusses a method enabled to perform good color matching, regardless of viewing conditions, such as ambient light, to solve the problem of the conventional color matching.

In the method discussed in Japanese Patent Application Laid-Open No. 2002-281338, converting steps are explicitly separated from one another, as compared with the conventional color matching method described by referring to FIG. 21. Each converting step can easily be updated to perform an optimum conversion process for devices.

The method discussed in Japanese Patent Application Laid-Open No. 2002-281338 can flexibly be applied to a wide range of systems, such as a scanner/printer system and a monitor/printer system, by a color management system. For example, in a desktop publishing (DTP) system, a color image displayed on the screen of a monitor can be matched in appearance with an image output to a printer by designating a monitor profile and a printer profile as a source profile and a destination profile, respectively.

Because quality of appearance match depends upon the profiles, it is important to create a profile that accurately associates a device-dependent color with a color in a PCS space. To that end, color estimation, which is estimation of a physical stimulus value obtained when a device-dependent color is actually printed or displayed, should accurately be performed.

A conventional color estimation technique is, for example, what is called a table-type color estimation technique using patch colorimetry values and interpolation. Various interpolation methods, such as a tetrahedron interpolation method, a cube interpolation method, and a triangular prism interpolation method, have been proposed as linear interpolation methods. Diverse interpolation methods, such as a spline interpolation method, have been proposed as nonlinear interpolation methods.

For example, Japanese Patent Application Laid-Open No. 10-136216 has proposed a method of changing an interpolation technique and a grid point interval according to whether input color data belongs to a specific unit cube when color estimation is performed.

The method discussed in Japanese Patent Application Laid-Open No. 10-136216 can enhance accuracy of color conversion of important colors by setting one or more specific unit cubes including important colors, for instance, a flesh, and an azure. Also, this method can enhance color reproducibility of a gray by setting a plurality of specific unit cubes including achromatic colors.

Japanese Patent Application Laid-Open No. 2000-261684 has proposed a method of performing, in a case where input color components are YMCK and output color components are Y'M'C'K', color estimation by performing a nonlinear interpolation when a color component Y' is calculated, and also performing a linear interpolation when each of the other color components is calculated.

However, the method discussed in Japanese Patent Application Laid-Open No. 10-136216 has a problem in that discontinuity may occur on a boundary surface between a specific unit cube and the outside thereof and may adversely affect tonability. In a case where input values are RGB values represented by digital signals and have 256 levels respectively corresponding to, for example, integer values ranging from 0 to 255, the input values are integer values, that is, discrete values. Thus, the discontinuity on the boundary surface is unlikely to become problematic. However, in a case where the input values are floating point values, tonability is highly likely to deteriorate.

In a case where interpolation methods respectively applied to a specific unit cube and the outside thereof are different, especially, where the interpolation methods, such as a linear interpolation method and a nonlinear interpolation method, are largely different in properties, results of interpolations respectively obtained by the two interpolation methods from the input values differ from each other. That is, even when the input values represent data on the boundary surface, results of the interpolations respectively obtained by the two interpolation methods differ from each other. Thus, it is apparent that the discontinuity occurs on the boundary surface. Similarly, even when the grid point interval is changed, and when the same interpolation method is applied to both cases, in an event where an actually measured value at a grid point in one of the cases differs from a result of interpolation in the other case, discontinuity naturally occurs.

The method discussed in Japanese Patent Application Laid-Open No. 2000-261684 is effective in a case where an input color space and an output color space are of the same kind. However, in a case where color estimation is performed when a device-dependent color is converted into a color in a PCS space, for example, in a case where color estimation is performed at conversion from an RGB space into a Lab space, an input color space and an output color space are of different kinds. Thus, this method cannot successfully be applied to this case.

SUMMARY OF THE INVENTION

An aspect of the present invention is to solve the problem of reduction in tonability in a case where a plurality of interpolation methods or a plurality of grid point intervals are defined depending upon areas of an input color space.

According to an aspect of the present invention, a color conversion apparatus includes a plurality of color conversion units configured to perform color conversion using a conversion table with different interpolation algorithms, a weighting unit configured to set weightings applied to the plurality of color conversion units, and a mixing unit configured to mix a plurality of color conversion results obtained by the plurality of color conversion units using the weightings calculated by the weighting unit.

According to another aspect of the present invention, a nonlinear interpolation capable of approximating characteristics of a device with good accuracy is employed in a color estimation algorithm. Also, a linear interpolation is applied only on an area having a high degree of linearity, for example, an area in the vicinity of a gray in a color space. Thus, an exemplary embodiment can solve a problem of a distortion of a gray axis in a result of interpolation using only a nonlinear interpolation method. Furthermore, an exemplary embodiment can enhance color reproducibility over the entire color space by using a nonlinear interpolation method while maintaining tonability, and also can enhance color reproducibility of a gray axis by using a linear interpolation method while maintaining tonability.

According to another aspect of the present invention, color reproducibility of an optionally designated area, for example, a flesh area or an azure area in a color space can be enhanced by setting a fine grid point interval in a part of the color space or changing an interpolation method with parts thereof, while maintaining performance and tonability over the entire color space.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 illustrates an example of sample point data.

FIG. 8 illustrates an example of device information.

FIG. 9 illustrates another example of device information.

FIG. 12 illustrates an example of weighting unit initialization data.

FIG. 16 illustrates an example of weighting unit initialization data.

FIG. 17 illustrates another example of weighting unit initialization data.

FIG. 18 illustrates an example of weighting data.

FIG. 19 illustrates an example of sample point data.

FIG. 20 illustrates another example of sample point data.

DETAILED DESCRIPTION OF THE EMBODIMENTS

Exemplary embodiments of the invention will now be described in detail below with reference to the accompanying drawings.

Color Matching Process Using Color Appearance Model

Figure 1:
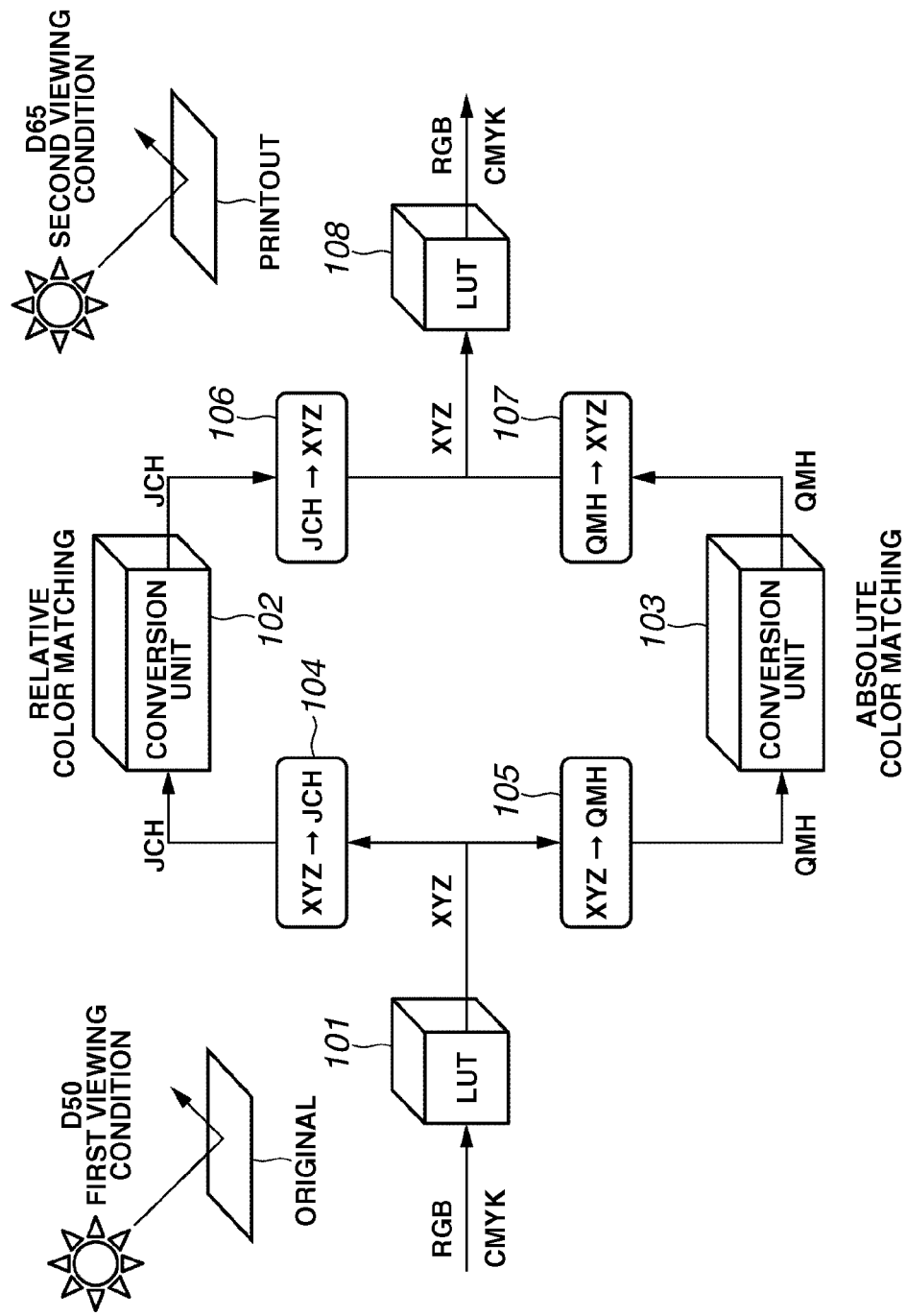
FIG. 1 is a conceptual diagram illustrating a color matching process using a color appearance model.

FIG. 1 is a conceptual diagram illustrating a color matching process using a color appearance model. As shown in FIG. 1, a conversion matrix or a conversion lookup table (LUT) 101 is used to convert an input-device-dependent color signal into device-independent color space data based on a white point reference for input-side ambient light. Color appearance model forward conversion units 104 and 105 convert an XYZ signal, which is output from the conversion LUT 101, into human color appearance color signals JCH and QMH according to input viewing conditions (a white point corresponding to a D50 illuminant, an illuminance level, and a state of ambient light), respectively. Color appearance model inverse conversion units 106 and 107 convert human color appearance color signals JCH and QMH into XYZ signals, which are device independent color signals, according to output viewing conditions (a white point corresponding to a D65 illuminant, an illuminance level, and a state of ambient light), respectively. A conversion matrix or a conversion lookup table (LUT) 108 is used to convert device-independent color space data based on a white point reference for output-side ambient light into an output-device-dependent color signal. Color space conversion units 102 and 103 convert input color space values into color space values according to a color gamut of an output device.

An input-device-dependent RGB or CMYK input color signal is converted by the conversion LUT 101 into a device-independent XYZ color signal based on the input viewing condition. Subsequently, the XYZ signal is converted by the color appearance model forward conversion units 104 and 105 into human appearance signals JCH and QMH, respectively, according to a first viewing condition (a white point corresponding to a D50 illuminant, an illuminance level, and a state of ambient light). In a case where relative color matching is performed, a JCH space is selected. In a case where absolute color matching is performed, a QMH space is selected.

The color conversion unit 102 or 103 performs gamut mapping of the color appearance signal JCH or QMH into an output device reproducible color gamut. Gamut-mapped color appearance signals JCH and QMH are converted into output-device-independent XYZ signals based on an output viewing condition by the color appearance model inverse conversion units 106 and 107 according to the output viewing condition (a white point corresponding to a D65 illuminant, an illuminance level, and a state of ambient light). Then, the XYZ signal is converted by the conversion LUT 106 into an output-device-dependent color signal.

The RGB or CMYK signal obtained in the above process is sent to the output device, which outputs an image displayed by using the color signal. A printout or a display viewed under the output viewing condition has the same color as that of an original viewed under the input viewing condition.

Generally, a white point corresponding to ambient light under the viewing condition is different from a white point corresponding to a standard illuminant used when colorimetry is performed on a color chart, such as a color target or a color patch. For example, the standard illuminant used to perform colorimetry is a D50 or D65 illuminant. However, ambient light actually used to view an image is not limited to a D50 illuminant and a D65 illuminant provided in a light booth, and is frequently illuminating light radiated from, for example, an incandescent bulb or a fluorescent lamp or light obtained by mixing illuminating light with sunlight. In the following description, for simplicity of description, light sources D50, D65, and D93 are used as an ambient light source under the viewing condition. Actually, XYZ values at a white point on a medium are set to be those of a white point corresponding to ambient light.

Functional Configuration

Figure 2:
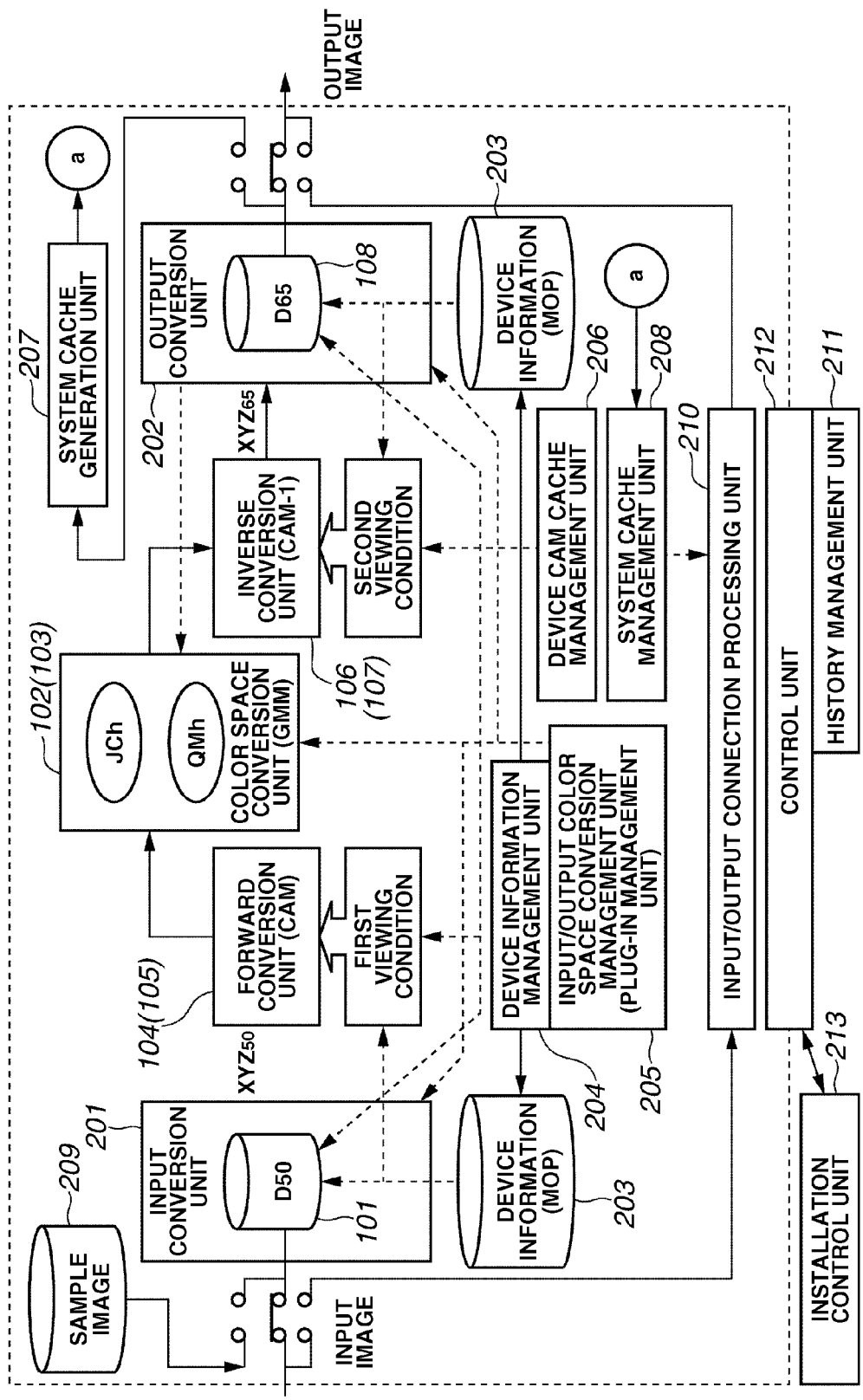
FIG. 2 is a block diagram illustrating a functional configuration of a color matching module according to an exemplary embodiment of the present invention.

FIG. 2 is a block diagram illustrating a functional configuration of a color matching module according to an exemplary embodiment of the present invention. In FIG. 2, a component equivalent to that shown in FIG. 1 is designated by the same reference numeral used to designate that shown in FIG. 1.

An input conversion unit 201 converts an input-device-dependent color signal (representing RGB or CMYK values) into data (XYZ values) representing a color in a device-independent color space, using the conversion LUT 101. The input conversion unit 201 has a function of obtaining a calorimetric value from device information and creating a conversion LUT and a function of providing the input viewing condition to the color appearance model forward conversion unit 104 (or 105). The device information indicates a corresponding relation between a device-dependent color signal and device-independent color space data (XYZ values).

An output conversion unit 202 converts the device-independent color space data (XYZ values) into an output-device dependent color signal (representing RGB or CMYK values). The output conversion unit 202 has a function of creating a conversion LUT from the device information, a function of providing the output viewing condition to the color appearance model inverse conversion unit 106 (107), and a function of providing information on the output device color gamut to the color space conversion unit 102 (103).

In the present exemplary embodiment, the input conversion unit 201 and the output conversion unit 202 are implemented by device plug-ins to enable switching of processes in accordance with the device and to provide expanded functions other than the above-described functions.

The color space conversion unit 102 (103) is provided as a color space conversion plug-in to enable the switching according to the gamut mapping (corresponding to ICC rendering indent).

Device information 203 provides the corresponding relation between the device color signal, which is measured in advance, and the device-independent color space data (XYZ values) and the viewing condition to the input conversion unit 201 and the output conversion unit 202.

A device information management unit 204 manages a device information storage location.

An input/output color space conversion management unit (plug-in management unit) 205 manages information on the version and the storage location of each of the device-plug-ins and the color space conversion plug-ins.

A device CAM cache management unit 206 manages data representing the conversion LUTs 101 and 108 respectively created by the input conversion unit 201 and the output conversion unit 202 and a CAM table and a CAM-1 table respectively created by the color appearance model forward conversion unit 104(105) and the color appearance model inverse conversion unit 106 (107). Also, the device CAM cache management unit 206 manages data representing conditions for creating the conversion LUTs 101 and 108, and conditions for creating the CAM table and the CAM-1 table. Thus, processes for generating data for the conversion processes can be omitted by using the data managed by the device CAM cache management unit 206. Consequently, high-speed color matching can be realized.

In the present exemplary embodiment, the CAM table and the CAM-1 table are associated with the device plug-ins and the device information. Because it is sufficient that the corresponding relation between the XYZ space and the JCH space corresponds to the viewing conditions (a white point corresponding to the light source, an illuminance level, and a state of ambient light), the CAM table and the CAM-1 table can be managed by being associated with the viewing conditions.

The device CAM cache management unit 206 creates and stores an LUT (system cache) corresponding to the combination among the input/output device plug-ins, the input/output device information, and the color space conversion plug-ins.

A system cache generation unit 207 generates a system cache.

A system cache management unit 208 manages system caches generated by the system cache generation unit 207.

A sample image 209 is used to generate a system cache and to be previewed.

An input/output connection processing unit 210 performs a color matching process using a system cache.

A history management unit 211 manages the combination among input device plug-ins, output device plug-ins, input device information, and the color space conversion plug-ins, which have been used, as a color-matching history.

A control unit 212 manages the above-described components, receives an external color matching instruction, and controls a color matching process.

An installation control unit 213 controls installation of the device information, the device plug-ins, and the color space conversion plug-ins.

Configuration of Apparatus

Figure 3:
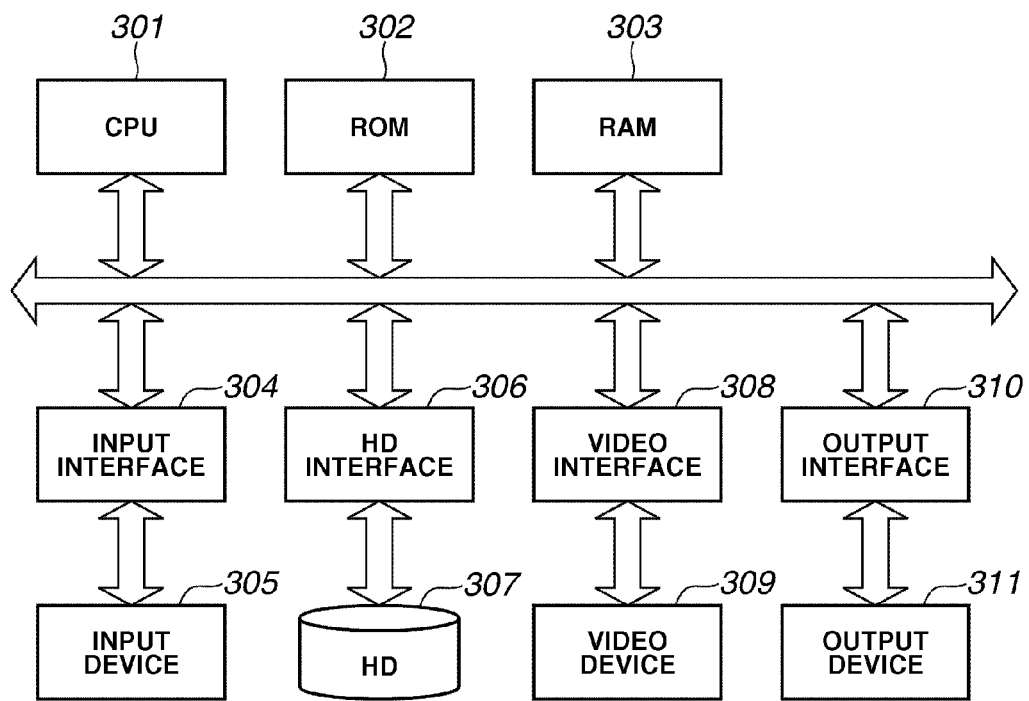
FIG. 3 is a block diagram illustrating an example of a configuration of an apparatus implementing the functional configuration shown in FIG. 2.

FIG. 3 is a block diagram illustrating an example of a configuration of an apparatus implementing the functional configuration shown in FIG. 2. The apparatus shown in FIG. 3 can be implemented by providing software, which is adapted to realize the functions illustrated in FIG. 2, to a general-purpose computer, for example, a personal computer. In this case, the software realizing the functions of the present embodiment can be included in an OS (operating system) of the computer apparatus. Alternatively, the software can be included in driver software instead of the OS.

A central processing unit (CPU) 301 controls an operation of the apparatus according to a program stored in a read-only memory (ROM) 302 and a hard disk (HD) 307 using a random access memory (RAM) 303 as a work memory. Also, the CPU 301 performs various processes, such as those relating to the color matching. An input interface 304 is an interface used to connect an input device 305 thereto. A hard disk interface 306 is used to connect the HD 307 thereto. A video interface 308 is used to connect a video device (monitor) 309 thereto. An output interface 310 is used to connect an output device 311 thereto.

The input device 305 includes picture-taking apparatuses, such as a digital still camera and a digital video camera, and various image input devices, for example, image readers including an image scanner and a film scanner. The output device 311 includes image output devices, for example, color monitors, such as a cathode ray tube (CRT) and a liquid crystal display (LCD), color printers, and film recorders.

The apparatus can utilizes a general-purpose interface, such as serial interfaces, which are, for instance, RS232C, RS422, universal serial bus (USB), and IEEE1394, and parallel interfaces, which are, for example, a small computer system interface (SCSI) and a Centronics interface, according to usage.

In the present exemplary embodiment, the device information used to perform the color matching, and the programs, such as the plug-ins, are stored in the HD 307. However, other kinds of storage media can be used instead of or in addition to the hard disk.

Data Configuration

Next, a configuration of major data relating to the color matching function illustrated in FIG. 2 is described below with reference to FIG. 4.

Figure 4:
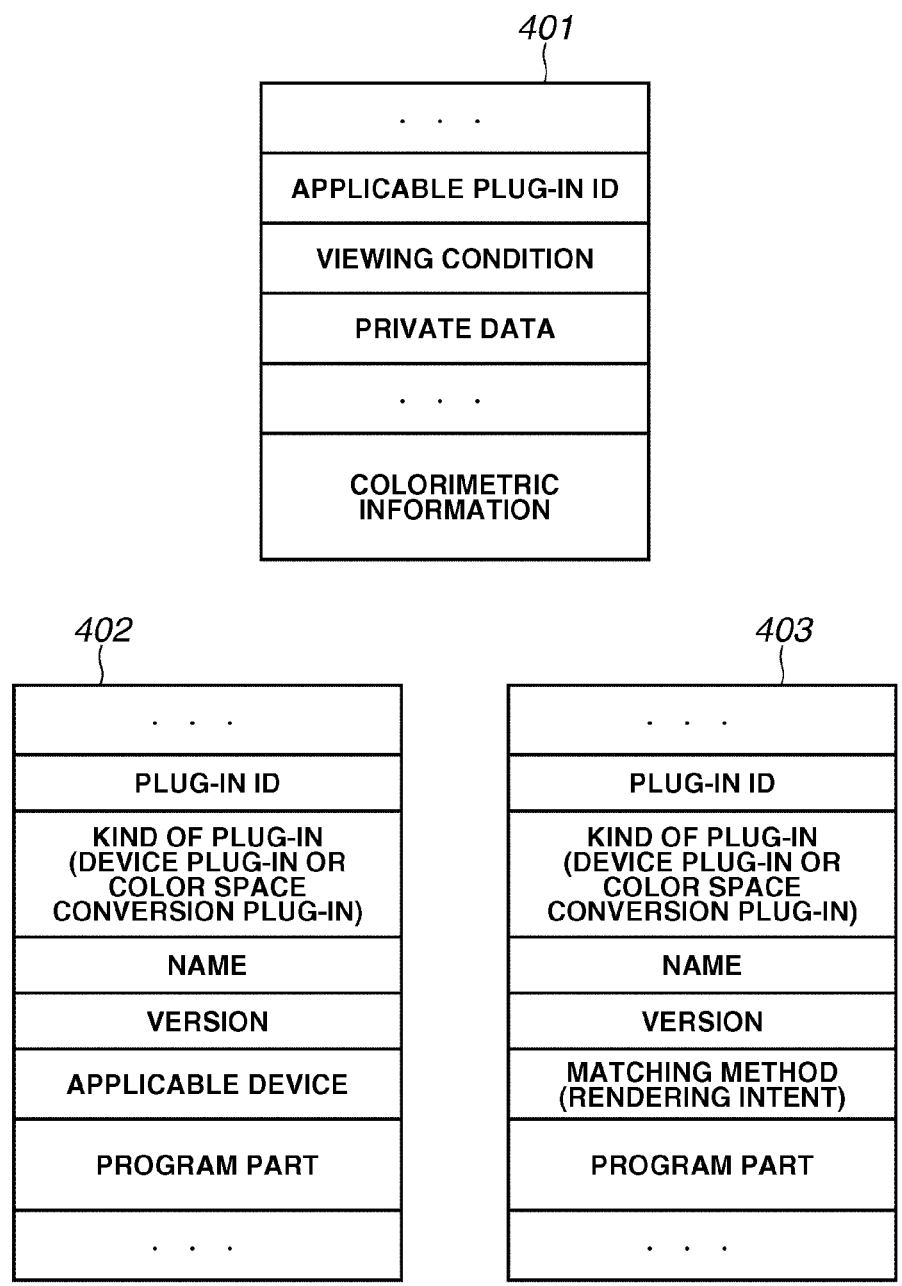
FIG. 4 is a diagram illustrating device information, device plug-ins, and color space conversion plug-ins.

The data can include items other than those described by referring to FIG. 4.

FIG. 4 is a diagram illustrating device information, device plug-ins, and color space conversion plug-ins.

Device information 401 includes information on the corresponding relation between device color signals and device-independent color space data used to create the conversion tables 101 and 108, information on the viewing conditions used to create the CAM conversion table and the CAM-1 table, a plug-in ID uniquely specifying a plug-in that specifies an applicable device plug-in, and private data including parameters used to control the plug-in. Plug-ins corresponding to input/output devices are provided. A device plug-in corresponding to a measurement device can be selected. Thus, the device plug-in ID is included in the device information 401.

Device plug-in information 402 includes information on a plug-in ID uniquely specifying a plug-in used in the present embodiment, a name of a plug-in, version information used to manage an update history, applicable device information specifying an applicable device, and programs performing the functions, such as the conversion, of the input conversion unit 201 and the output conversion unit 202. For example, a UUID is used as the plug-in ID. The applicable device information can designate an applicable range by denoting a general device classification, such as a digital camera and a printer, or a specific model.

Color space conversion plug-in information 403 includes information on a plug-in ID uniquely specifying a plug-in used in the present embodiment, a name of a plug-in, version information used to manage an update history, applicable device information specifying an applicable device, a color space conversion method corresponding to rendering intent, and programs performing the functions of the color space conversion unit 102 (103). Similarly to the device plug-in information, a UUID is used as the plug-in ID.

Device Information

FIGS. 8 and 9 illustrate examples of the device information 401 shown in FIG. 4. The device information 401 includes weighting setting data and sample point data.

Data "RATE='GRAY'" is an example of weighting setting data 1111, which will be described later.

Data "RATE_0_0_0=1" and "RATE_0_0_32=1" are examples of the weighting setting data 1111, which will be described later.

Sample data 1110 shown between data "DATA_START" and "DATA_END" in each of FIGS. 8 and 9 designates values indicating the correspondence between device color signals and the device-independent color space data (XYZ values). As shown in FIGS. 8 and 9, RGB signals are used as device color signals, while XYZ values are used as the device-independent color space data.

As illustrated in FIGS. 8 and 9, the weighting setting data 1111 can be managed in a field, in which a sample point data string is stored, instead of being managed independent of the sample point data. For example, the weighting setting data can be written at the end of the sample point data string.

Although the device information is represented in text format in the present embodiment, the device information can be represented in another format, such as XML format.

Configuration of Input Conversion Unit 201

Figure 5:
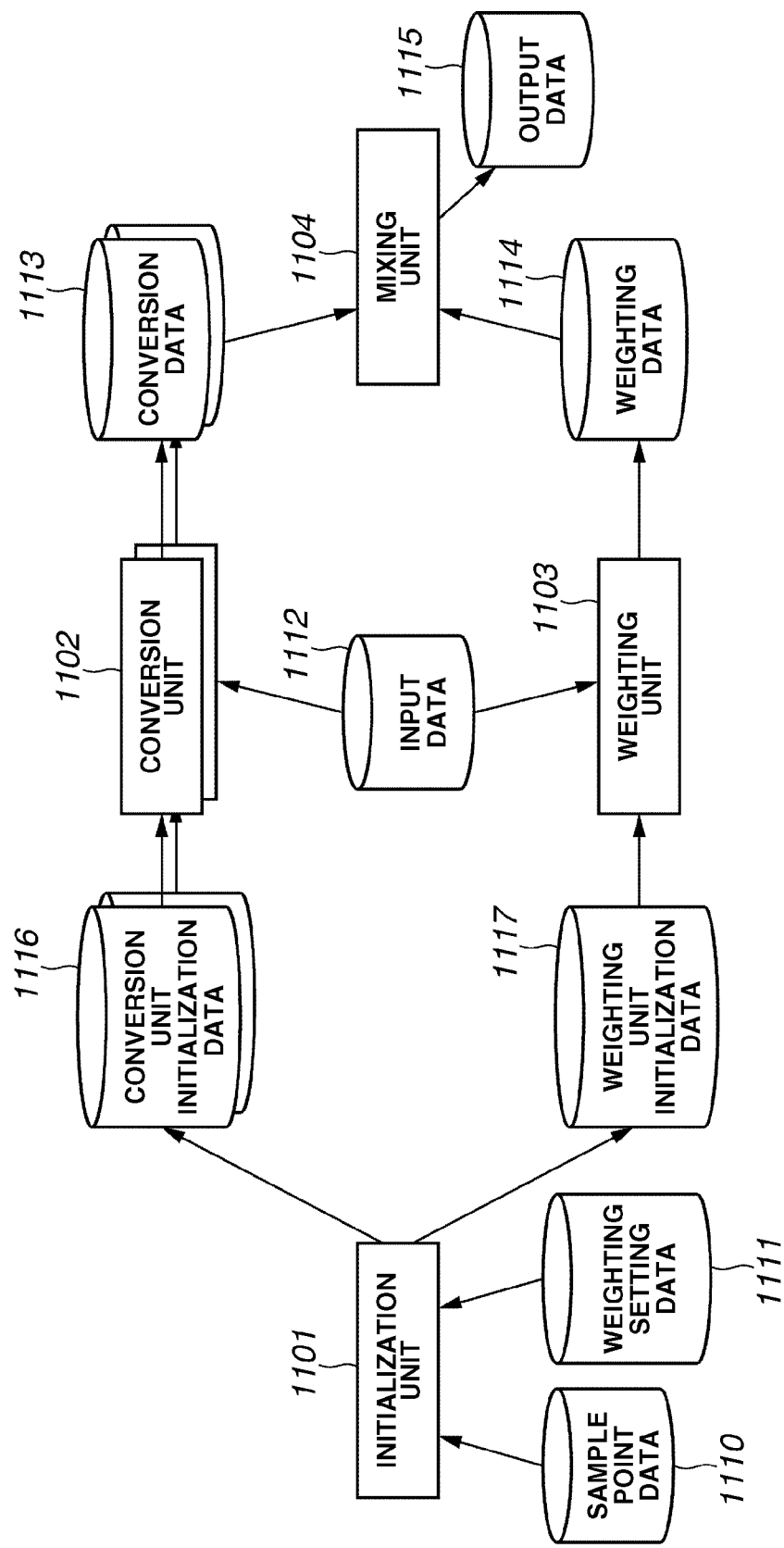
FIG. 5 is a block diagram illustrating an example of a configuration of an input conversion unit.

FIG. 5 is a block diagram illustrating an example of the configuration of the input conversion unit 201 shown in FIG. 2. In the present exemplary embodiment, the conversion unit 201 includes a converting unit (hereunder referred to as a tetrahedron interpolation conversion unit) adapted to perform a tetrahedron interpolation method and also includes a converting unit (hereunder referred to as a spline interpolation conversion unit) adapted to perform a spline interpolation method.

First, the tetrahedron interpolation method and the spline interpolation method respectively performed in the converting units are described below.

Tetrahedron Interpolation

According to the tetrahedron interpolation method used in a tetrahedron interpolation conversion unit 1102, input data (RGB values) is converted into output data (L*a*b* values) using a lookup table (FIG. 10) that is created by an initialization unit 1101 from sample point data 1110.

The lookup table (LUT) is created from the values indicating the correspondence between the device color signals (RGB values) and the device-independent color space data (XYZ values), which are shown between the data "DATA_START" and "DATA_END" in the sample point data shown in FIGS. 8 and 9. More specifically, the XYZ values included in the sample point data are converted into the L*a*b* values according to a predetermined expression. Subsequently, sample point data corresponding to the RGB values at a grid point of the LUT is selected. Then, the L*a*b* values corresponding to the selected sample point data are stored in the LUT. Thus, the LUT is created.

Figure 10:
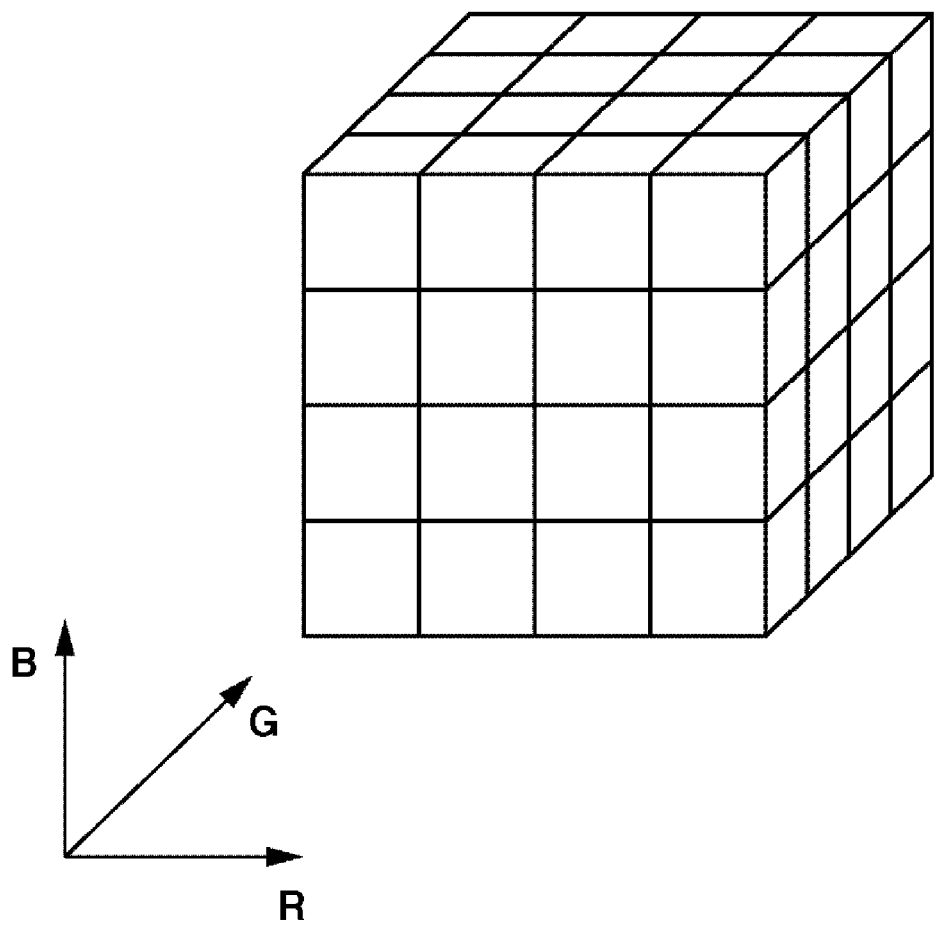
FIG. 10 illustrates an example of conversion unit initialization data for a tetrahedron interpolation method.

For example, in a case where the sample point data, which is obtained after the L*a*b* conversion, is as illustrated in FIG. 7, an "RGB→L*a*b*_LUT" having 5*5*5 grid points shown in FIG. 10 is created.

Figure 11:
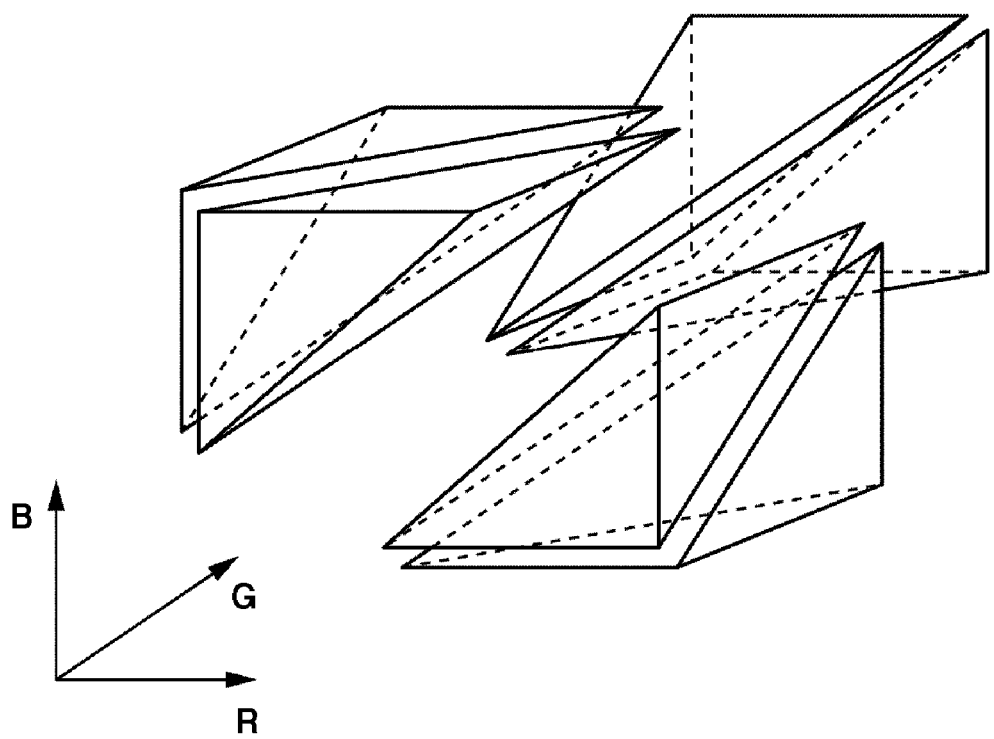
FIG. 11 illustrates the tetrahedron interpolation method.

The tetrahedron interpolation conversion unit 1102 performs a linear interpolation process using grid point data, which corresponds to four apices of a tetrahedron region including input data. As shown in FIG. 11, the tetrahedron region is obtained by dividing a hexahedron, which is surrounded by eight color surfaces, into six parts. In the present embodiment, the hexahedron region is divided into six tetrahedron regions based on an axis representing R=G=B. Therefore, the tetrahedron interpolation conversion unit 1102 in the present exemplary embodiment can reproduce a gray with high accuracy.

Spline Interpolation

The spline interpolation method used in the spline interpolation conversion unit 1102 is described below.

A B-spline field according to the present exemplary embodiment is defined by a multiple summation expression using the following piecewise polynomials as basis functions.

$$\lambda = \Sigma_i \Sigma_j \Sigma_k c\lambda ijk Nri(rr) Ngj(gg) Nbk(bb)$$

$$a = \Sigma_i \Sigma_j \Sigma_k caijk Nri(rr) Ngj(gg) Nbk(bb)$$

$$b = \Sigma_i \Sigma_j \Sigma_k cbijk Nri(rr) Ngj(gg) Nbk(bb)$$

where rr, gg, and bb are RGB values, $\lambda$, a, and b are L*a*b* values, Nr is a basis function in the direction of the R-axis, Ng is a basis function in the direction of the G-axis, Nb is a basis function in the direction of the B-axis, c$\lambda$ijk, caijk, and cbijk are coefficients, and suffixes i, j, and k attached to the basis functions Nr, Ng, and Nb are the basis function Nos. of the basis functions corresponding to the R-axis, the G-axis, and the B-axis.

The spline interpolation conversion unit 1102 converts the input data (RGB values) into the output data (L*a*b* values) using the multiple summation expression.

Figure 15:
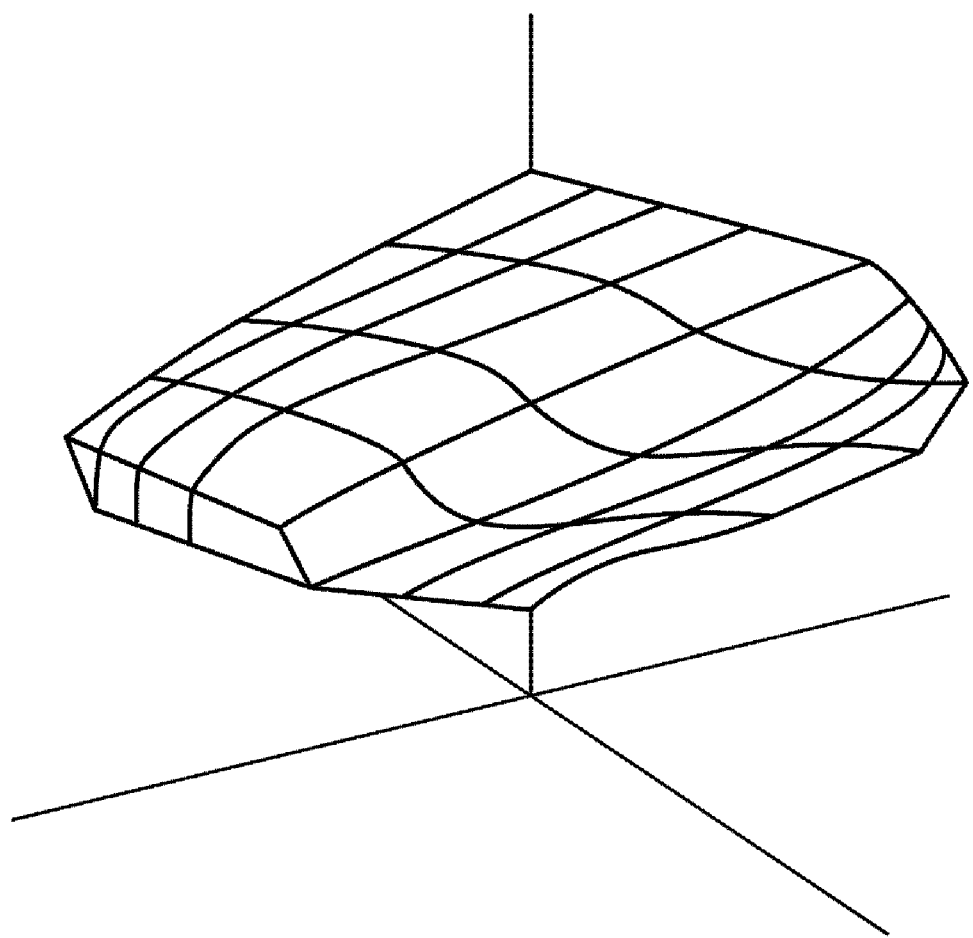
FIG. 15 is a graph illustrating a result of a process performed by a conversion unit for a spline interpolation.
Figure 21:
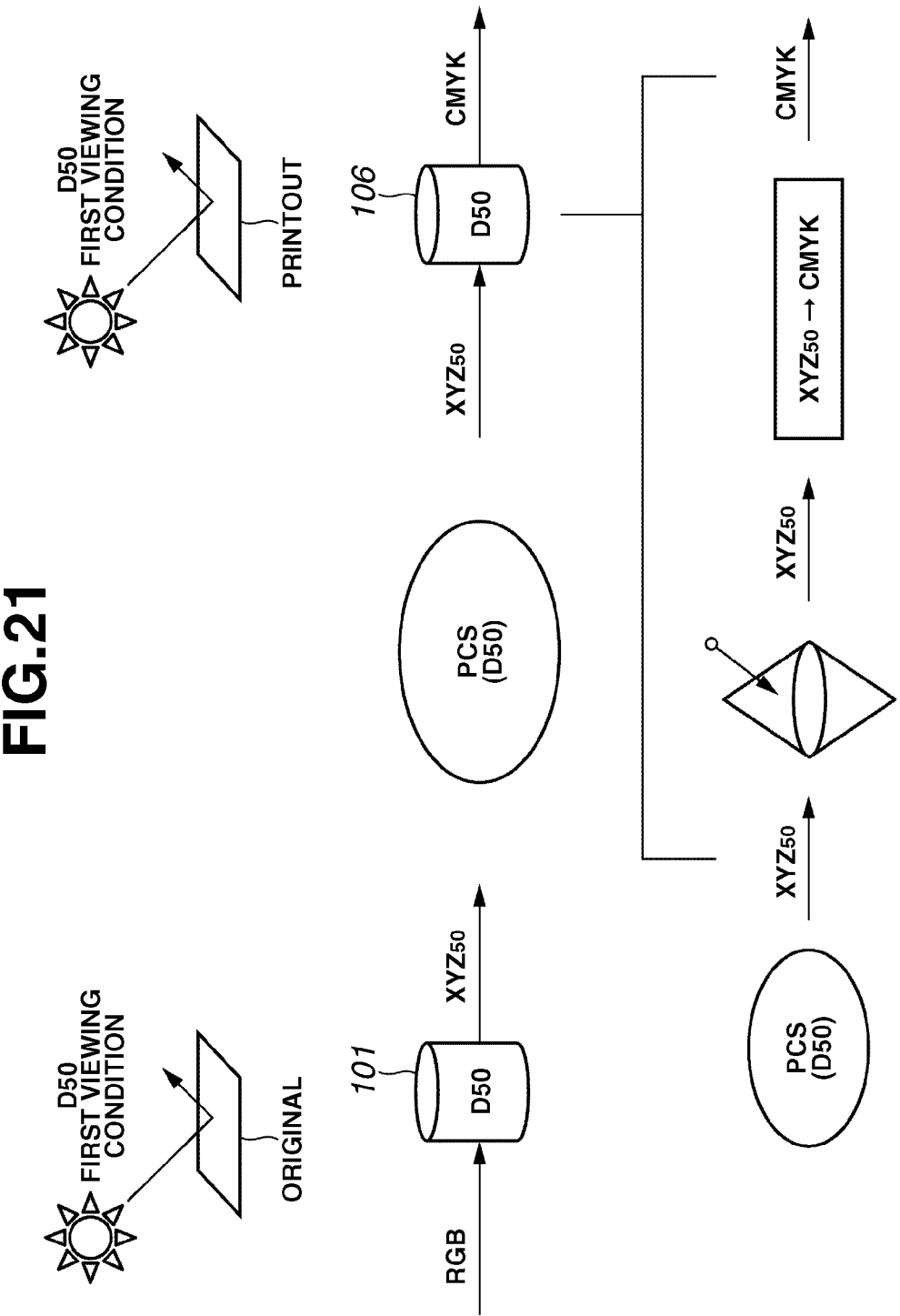
FIG. 21 is a conceptual diagram illustrating a conventional general color matching method.

According to the spline interpolation in the present exemplary embodiment, as illustrated in FIG. 15, a change in the L*a*b* values with respect to the RGB values can smoothly be expressed. FIG. 15 represents a result of the spline interpolation as a distribution in the L*a*b* space. Lines other than axes shown in FIG. 15 represent a trajectory of change in the L*a*b* values, which is caused when one of the RGB values changes.

Figure 13:
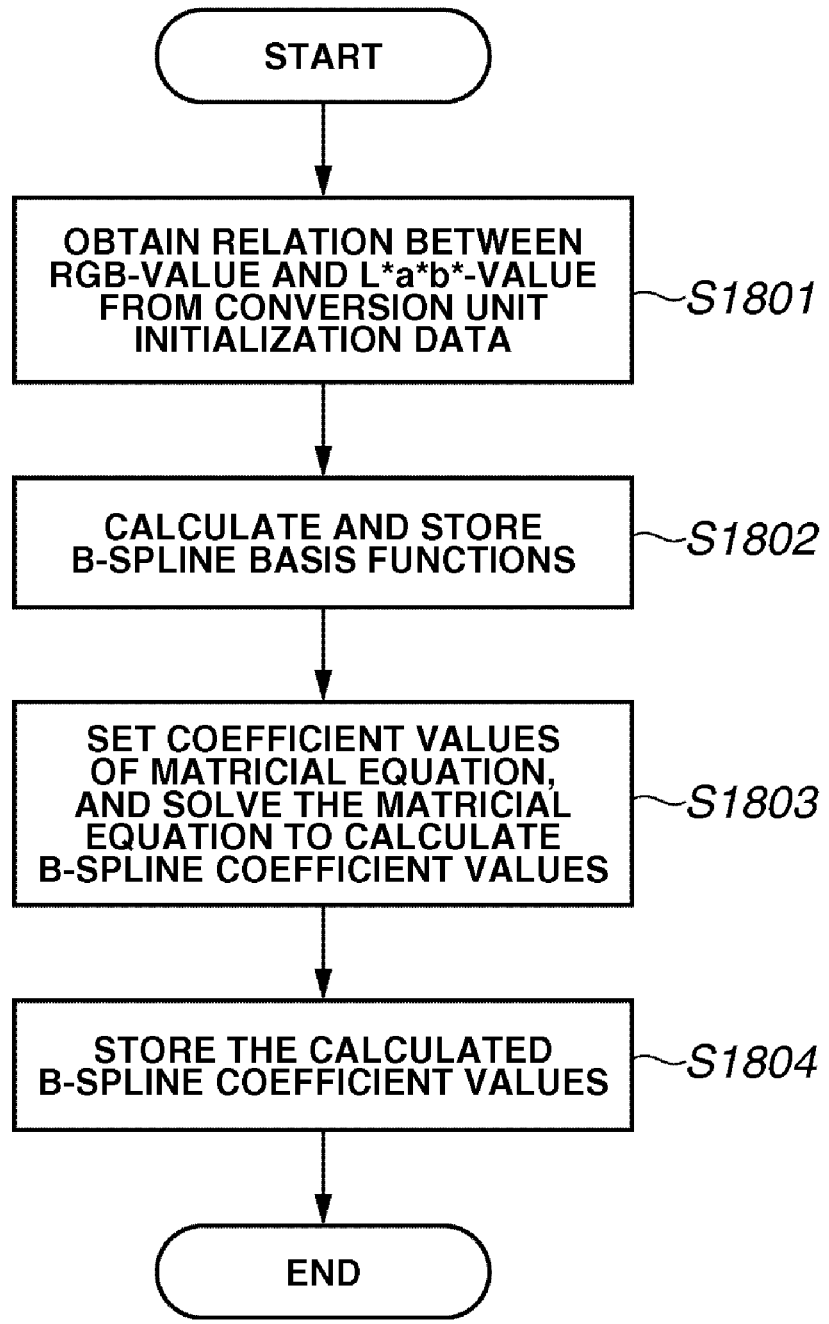
FIG. 13 is a flowchart illustrating a process for calculating conversion unit initialization data for a spline interpolation method.

FIG. 13 is a flowchart illustrating a calculation process for calculating B-spline coefficients and basis functions, which is performed in the initialization unit 1101. Hereinafter, the process performed in a case where data illustrated in FIG. 7 is used as sample point data is described.

First, in step S1801, the corresponding relation between the RGB values and the L*a*b* values is obtained from the sample point data. Hereunder, the RGB values of an i-th edit color are designated by rri, ggi, and bbi. The L*a*b* values of the output data are denoted by $\lambda$i, ai, and bi.

In the sample point data, a row of B-values is called a "step" of the B-value when R-values and G-values are 0. The B-value step shown in FIG. 7 is (0, 64, 128, 192, 255). The B-value has no other values than those of the B-value step. Similarly, an R-value step and a G-value step are the same as (0, 64, 128, 192, 255).

Figure 14:
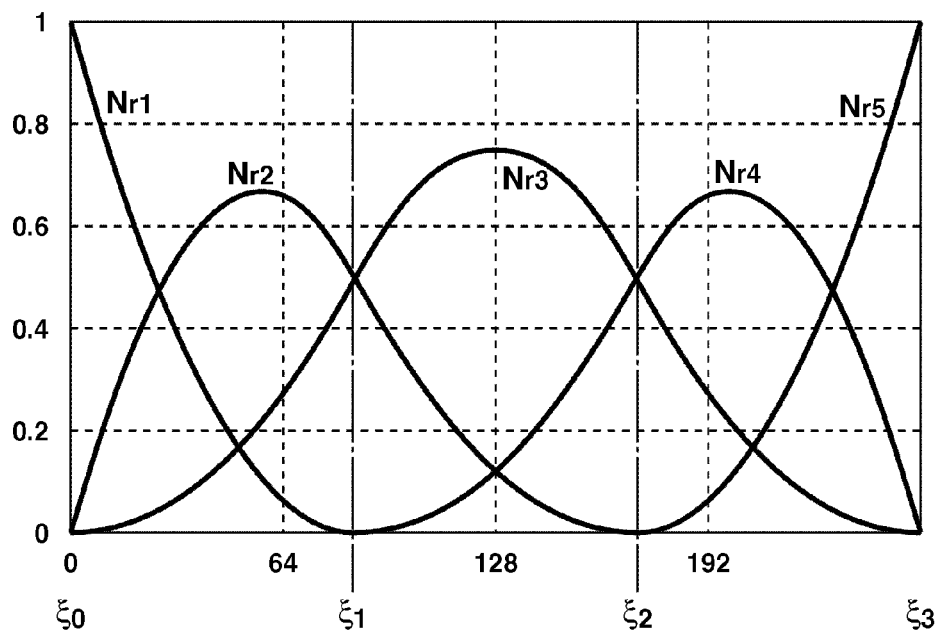
FIG. 14 illustrates an example of a basis function.

Subsequently, in step S1802, the basis functions are calculated from the sample point data shown in FIG. 7 according the steps of the R/G/B-values. The calculated basis functions are stored. A general De-Boor-Cox algorithm is used for calculating the basis functions. In a case where the steps of the R/G/B-values are the same and any of the basis functions Nr, Ng, and Nb are third-order B-spline basis functions, any of the basis functions are as illustrated in FIG. 14. Each of the basis functions has four nodal points $\xi$0 to $\xi$3, as illustrated in FIG. 14. FIG. 14 shows a basis function Nr corresponding to the R-axis. Hereunder, the description is made below by assuming that any of the basis functions are third-order B-spline basis functions.

Subsequently, in step S1803, a matricial equation "f=MC" is solved for $\lambda$*-component, a*-component, b*-component using the calculated basis functions and the corresponding relation between the RGB values and the L*a*b* values, according to an LU decomposition method. Thus, each of the coefficients is calculated.

The calculation of the coefficients according to the above equation is described below in detail.

First, a component mst corresponding to an s-th row and a t-th column of a matrix M is calculated as follows.

$$mst = Nri(rrs) Ngj(ggs) Nbk(bbs)$$

where t=25(i−1)+5(j−1)+k, and
i, j, k are integers ranging from 1 to 5.

The relation among the suffixes i, j, and k changes according to the number of nodes and the order of the basis function. For example, in a case where the third-order B-spline basis function has six nodal points, the following relation among the suffixes i, j, and k is established.

$$t = 49(i-1) + 7(j-1) + k.$$

Next, the calculation of the coefficients c$\lambda$ijk, caijk, and cbijk is described below.

First, to calculate the coefficient c$\lambda$ijk, the following matricial equation is solved according to the LU decomposition method.

$$f\lambda = [\lambda 1, \lambda 2, \ldots, \lambda 125]$$

$$c\lambda = [c\lambda 111, c\lambda 112, \ldots, c\lambda 115, c\lambda 121, \ldots, c\lambda 155, c\lambda 211, \ldots, c\lambda 554, c\lambda 555]$$

$$f\lambda = M \cdot c\lambda$$

Subsequently, to calculate the coefficient caijk, the following matricial equation is solved according to the LU decomposition method.

$$fa = [a1, a2, \ldots, a125]$$

$$ca = [ca111, ca112, \ldots, ca115, ca121, \ldots, ca155, ca\ 211, \ldots, ca554, ca555]$$

$$fa = M \cdot ca \quad (4)$$

Subsequently, to calculate the coefficient cbijk, the following matricial equation is solved according to the LU decomposition method.

$$fb = [b1, b2, \ldots, b125]$$

$$cb = [cb111, cb112, \ldots, cb115, cb121, \ldots, cb155, cb211, \ldots, cb554, cb555]$$

$$fb = M \cdot cb \quad (5)$$

Then, in step S1804, the calculated coefficients are stored.

As illustrated in FIG. 15, a change in the L*a*b* values with respect to the RGB values can smoothly be expressed by using the calculated B-spline field. FIG. 15 represents a result of the B-spline interpolation as a distribution in the L*a*b* space. Lines other than axes shown in FIG. 15 represent a trajectory of change in the L*a*b* values, which is caused when one of the RGB values changes.

Figure 6:
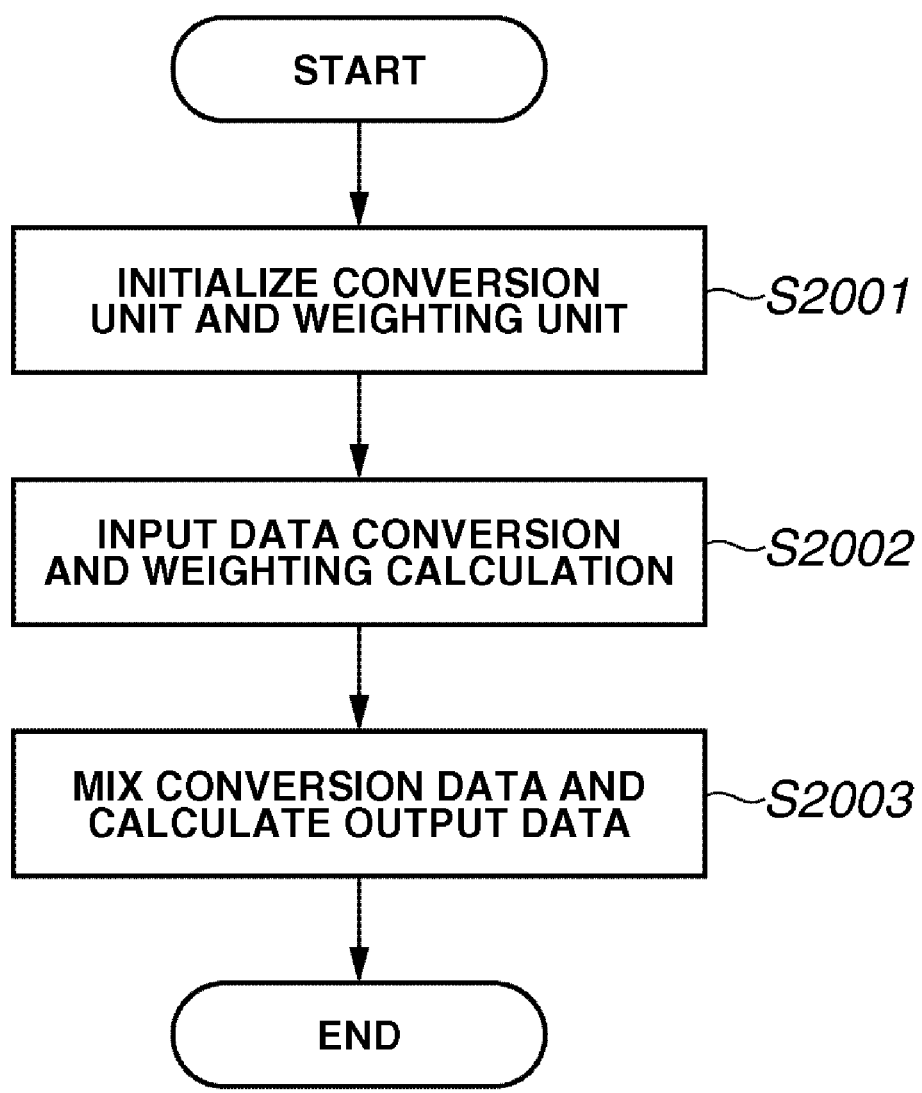
FIG. 6 is a flowchart illustrating an example of a process to be performed in the input conversion unit.

Hereinafter, the configuration of the input conversion unit 201 and a procedure performed by the input conversion unit 201 are described below with reference to FIGS. 5 and 6.

In step S2001, the initialization unit 1101 generates conversion unit initialization data 1116 and weighting unit initialization data 1117 to initialize the conversion unit 1102 and the weighting unit 1103, respectively.

The initialization unit 1101 acquires sample point data 1110 and weighting setting data 1111 from the device information. Then, the initialization unit 1101 generates conversion unit initialization data 1116 for the tetrahedron interpolation conversion unit and conversion unit initialization data 1116 for the spline interpolation conversion unit.

The tetrahedron interpolation unit initialization data is a lookup table shown in FIG. 10. The spline interpolation conversion unit initialization data is the counted number of the B-spline field obtained by the process shown in FIG. 13.

The initialization unit 1101 generates the weighting unit initialization data 1117.

An example of the weighting unit initialization data 1117 is shown in FIG. 12. Data RGB_R, RGB_G, and RGB_B correspond to the R-value, the G-value, and the B-value of the RGB values represented by a device color signal. Data RATE_1 is weighting data for the tetrahedron interpolation conversion unit. Data RATE_2 is weighting data for the spline interpolation conversion unit. A value ranging from 0 to 1 is set in each of the data RATE_1 and RATE_2 so that a sum of the data RATE_1 and RATE_2 is equal to "1".

The values of the data RATE_1 and RATE_2 are calculated as follows.

In a case where the weighting setting data 1111 is written as "RATE='GRAY'" in the device information, as shown in FIG. 8, the weighting initialization data is generated as follows. The data "RATE_1=1 and RATE_2=0" are set at a sample point, each of the R-value, the G-value and the B-value of which is the same value, that is, at a sample point of a gray. Meanwhile, the data "RATE_1=0 and RATE_2=1" are set at a sample point, each of the R-value, the G-value and the B-value of which is not the same value. According to the example shown in FIG. 8, the weighting data can simply be set at a sample point that meets a specific condition that the color is a gray.

On the other hand, in a case where the weighting setting data 1111 is written in the device information corresponding to the RGB values designated as shown in FIG. 9, the weighting unit initialization data is generated as follows. In a case where the weighting setting data is written corresponding to the designated RGB values, as shown in FIG. 9, when no weighting data is designated in the device information, data "RATE_1=0.5, RATE_2=0.5" is set as the weighting data.

RATE information written in the device information is extracted. Then, the value of the RATE_1 of the RGB value designated by the RATE information is set at a value designated by the RATE information. For example, in a case where the data "RATE_0_0_0=1" is extracted, data "RATE_1=1, RATE_2=0" is set at a sample point corresponding to the data "R=0, G=0, B=0". In a case where the data "RATE_0_0_32=0" is extracted, data "RATE_1=0, RATE_2=1" is set at a sample point corresponding to the data "R=0, G=0, B=32". According to the example shown in FIG. 9, weighting data can individually be set at sample points. In this case, a rate of the tetrahedron interpolation can be set not only at the sample point corresponding to a gray but at a given sample point. Thus, flexibility is enhanced. For instance, weighting data can be set at each sample point, as shown in FIG. 12.

In step S2002, each conversion unit 1102 converts input data. Also, the weighing unit 1103 calculates weighting data corresponding to the input data.

Each of the tetrahedron interpolation conversion unit 1102 and the spline interpolation conversion unit 1102 converts the input data 1112. Thus, tetrahedron interpolation conversion data 1113 represented by L*a*b* values, and spline interpolation conversion data 1113 represented by L*a*b* values are generated.

The weighting unit 1103 calculates weighting data 1114 corresponding to the input data 1112.

The weighting unit 1103 uses weighting unit initialization data 1117 and creates a lookup table (LUT) therein. For example, in a case where the weighting unit initialization data 117 shown in FIG. 12 is used, the weighting unit 1103 creates a LUT that associates the data "RATE_1 " and "RATE_1" with the RGB values. Also, the weighting unit 1103 generates weighting data 1114 ("RATE_1 " and "RATE_2 ") corresponding to the input data by performing the linear interpolation (for example, the tetrahedron interpolation) using the created LUT.

In step S2003, the mixing unit 1104 mixes the tetrahedron interpolation conversion data with the spline interpolation conversion data to calculate output data. More specifically, the mixing unit 1104 mixes the tetrahedron interpolation conversion data with the spline interpolation conversion data using the weighting data ("RATE_1 " and "RATE_2 ") to calculate output data 1115, as follows. OUTPUT DATA=RATE_1*(tetrahedron interpolation conversion data)+RATE_2*(spline interpolation conversion data)

Then, the output data (L*a*b* values) is converted into XYZ data using a predetermined expression. Subsequently, the obtained XYZ data is output.

The conversion units have different features. According to the present exemplary embodiment, a weighting corresponding to a conversion unit whose feature is suitable for a color region of the input data can be set to be large. That is, color reproduction suitable for a specific color region can be realized. The weighting unit 1103 performs the interpolation process on the weighting data. Thus, the weighting data gradually changes according to adjacent weighting data. Accordingly, continuity of each color can be maintained over the entire color region.

For example, the present exemplary embodiment has the conversion units respectively using the tetrahedron interpolation and the spline interpolation. The tetrahedron interpolation according to the present exemplary embodiment uses a linear interpolation and is performed while dividing the hexahedron into six tetrahedron regions based on a gray axis. Thus, the tetrahedron interpolation according to the present exemplary embodiment excels in reproducibility and tonability corresponding to a gray. In contrast, the spline interpolation is a nonlinear interpolation and can represent smoothly a change in output value corresponding to an input value, as shown in FIG. 15, so that the property of the device can be approximated with high precision. However, when the nonlinear interpolation is performed on the gray axis, the gray axis is sometimes interpolated to be distorted. Therefore, the reproducibility of a gray is sometimes degraded.

In this regard, the weighting setting data is set as shown in FIG. 8. Thus, a rate of use of the tetrahedron interpolation to a sum of use of the tetrahedron interpolation and use of the spline interpolation can be set to be "1" in the vicinity of the gray axis. Conversely, in an area relatively distant from the gray axis, a rate of use of the spline interpolation to the sum can be increased. Consequently, the output data 1115 obtained in the vicinity of the gray axis can be set to be close to a value obtained only by the tetrahedron interpolation conversion data. As an area, at which the output data is obtained, is gradually away from the gray axis, the output data can be set to be closer to a value obtained only by the spline interpolation conversion data.

The spline interpolation is a nonlinear interpolation and can achieve interpolation by approximating the property of a general device with good accuracy. However, when the nonlinear interpolation is performed on the gray axis, the interpolation is sometimes performed while distorting the gray axis. As illustrated in FIG. 8, the tetrahedron interpolation is performed in an area in the vicinity of a gray to enhance the color reproducibility of a gray. Because the weighting data is obtained by the interpolation, the weighting continuously changes in the color space. Consequently, the output data continuously changes so that the tonability is maintained.

Thus, the color reproducibility of a gray can be enhanced by the linear interpolation. Also, the color reproducibility can be enhanced by the nonlinear interpolation over the entire color space while the tonability is maintained.

Configuration of Output Conversion Unit 202

The output conversion unit 202 performs a process similar to the process performed by the input conversion unit 201. The output conversion unit 202 differs form the input conversion unit 201 in that the output conversion unit 202 converts device-independent color space data into a device color signal using the device information 203. Accordingly, the process for generating the conversion unit initialization data 1116 in the initialization unit 1101 is changed.

The method of generating the weighting unit initialization data 1117 and the processes performed by the conversion unit 1102, the weighting unit 1103, and the mixing unit 1104 are similar to those performed in the input conversion unit 202.

Modification

Although L*a*b* values are used as device-independent color space data in the above-described embodiment, other color space data, such as L*u*v values, XYZ values, and Jab values, can be used.

Although the data illustrated in FIG. 12 is generated as the weighting unit initialization data in the above-described embodiment, data as illustrated in FIG. 16 can be used as the weighting unit initialization data. In the data RATE included in the weighting unit initialization data shown in FIG. 16, only the data RATE corresponding to the tetrahedron interpolation conversion unit is described. In the above-described embodiment, a total of the data "RATE_1" and "RATE_2" is set to be "1". Thus, the data "RATE_2" can easily be calculated from the data "RATE_1". In the example shown in FIG. 16, the L*a*b* values corresponding to the RGB values that correspond to grid points are stored. Thus, the data shown in FIG. 16 can serve as both of the tetrahedron interpolation conversion unit initialization data and the weighting unit initialization data.

Although the above-described embodiment uses two conversion units, the apparatus can use N conversion units (N>2) FIG. 17 shows an example of weighting unit initialization data in this case. The data "RATE_1," "RATE_2" and "RATE_3" have the same meaning as that of the data "RATE". Hereunder, these data are generically described as data "RATE_*". The expression "RATE_*" is used only in a case where two or more kinds of conversion units 1102 are provided. In the case of the example shown in FIG. 17, only three kinds of conversion units are employed, so that the data "RATE_*" corresponding to the highest number of kinds is the data "RATE_3". However, the number of kinds of the data "RATE_*" can be increased according to the number of kinds of the conversion units 1102. Also, the data "RATE_*" corresponding to the device color signal is set so that a total of the data "RATE_*" is "1". For example, in a case where three kinds of the conversion units are provided, the data "RATE_1," "RATE_2" and "RATE_3" are set so that a total of the data "RATE_1" "RATE_2" and "RATE_3" is "1". At that time, only the data "RATE_1" and "RATE_2" can be generated without generating the data "RATE_3" so that the value corresponding to the data "RATE_3", which is obtained by subtracting the values corresponding to the data "RATE_1" and "RATE_2" from "1", is present.

The interval of the RGB values represented by the device color signals corresponding to the weighting unit initialization data can be made to differ from the interval of the RGB values represented by the device color signals corresponding to the conversion unit initialization data. More flexible setting can be realized by defining the sample points corresponding to the weighting unit initialization data independent of the sample points corresponding to the conversion unit initialization data.

Additionally, data shown in FIG. 18 can be used as the weighting unit initialization data. Conversion unit initialization data shown in FIG. 18 is an example of the data used in the case of employing two kinds of conversion units. The conversion unit initialization data shown in FIG. 18 is adapted so that weightings can be set corresponding to L, a, and b values, respectively, independent of one another by using data "RATE_1 _L", "RATE_1 _A", and "RATE_1 _B". Consequently, for example, the a-value and the b-value of a gray portion can be obtained by using the tetrahedon interpolation, while the L-value thereof can be obtained by using the spline interpolation. Thus, the L-value can smoothly be changed without hue deviation. The reproducibility of a gray can be enhanced still more.

Also, sample point data used in the tetrahedron interpolation conversion unit can be set to differ from sample point data used in the spline interpolation conversion unit.

In step S2001 (FIG. 6), sample point data 1116 shown in FIG. 19 is used to initialize the tetrahedron interpolation conversion unit 1102. Also, sample point data 1116 shown in FIG. 20 is used to initialize the spline interpolation conversion unit 1102. Also, the weighting unit initialization data shown in FIG. 12 is used to initialize the weighting unit.

In the case of the sample point data shown in FIG. 19, the R-value represented by the device color signal is defined only in a range from 0 to 64. The G-value represented by the device color signal is defined only in a range from 0 to 64. The B-value represented by the device color signal is defined only in a range from 0 to 255. The data "RATE_1" of the weighting unit initialization data 1117 shown in FIG. 12 represents a rate of use of the spline interpolation conversion unit 1102 to the sum. The data "RATE_2" of the weighting unit initialization data 1117 shown in FIG. 12 represents a rate of use of the tetrahedron interpolation conversion unit 1102 to the sum. A value of "0" is set in the data "RATE_1" corresponding to a region outside the above range, in which the R-value ranges from 0 to 64, the G-value ranges from 0 to 64, and the B-value ranges from 0 to 255, and corresponding to a boundary part. Values, which are larger than "0", are set in the data "RATE_1" corresponding to the other range. That is, in the above range, the rate of use of the spline interpolation conversion unit 1102 is high. The interval of the sample points located outside the above range is "32" in terms of the RGB-values. However, the interval of the sample points located in the above range is finely set to be "16" in terms of the RGB-values.

For example, in a case where the linearity in the above range is extremely low, the nonlinear interpolation is performed only on the above range, similarly to the present exemplary embodiment. The linear interpolation is performed on the other part to perform the process at high speed. Thus, conversion accuracy can be enhanced.

For example, even in a case where the tetrahedron interpolation is performed on the above range, the conversion accuracy can be enhanced because the sample points are finely located within the above range. At that time, instead of finely locating sample points in the entire range, sample points are finely located in a restricted range in which the conversion accuracy is not good. Thus, the color conversion accuracy can be enhanced. Also, a reduction in color conversion speed can be minimized while maintaining tenability.

Other 8-point interpolation algorithms, interpolation algorithms using a body-centered cubic lattice, and a prism interpolation algorithm can be used as the interpolation algorithm employed in the conversion unit.

An example of a technique realizing a color management includes a Color Management System (CMS) according to an International Color Consortium (ICC) color profile determined by the ICC. This system defines a device-independent hub color space or a Profile Connection space (PCS) to perform color matching. Then, this system realizes color management using a source profile, which prescribes color conversion from a device color space to a hub color space/PCS, and also using a destination profile that prescribes color conversion from a hub color space/PCS to a device color space. A processing system is configured to perform the following major two conversion processes. That is, the processing system converts color signal values, which correspond to colors in a device color space adapted according to the source profile to an input device that inputs an image, into color signal values corresponding to colors in the hub color space/PCS. Subsequently, the processing system converts the color signal values, which correspond to colors in the hub color space/PCS, into color signals corresponding to colors in a device color space adapted to an output device according to the destination profile. The present invention can be applied to the above conversion processes.

Also, the present invention can be applied to a direct color conversion performed without intervention of a PCS, for example, in a color space of a monitor printer.

As described above, according to the above-described exemplary embodiment, even when a plurality of interpolation methods and a plurality of grid point intervals are defined depending upon areas of an input color space, color conversion can be achieved without deteriorating tonability.

The present invention can also be applied to a personal computer, a portable terminal including a portable telephone, and an image forming apparatus, regardless of the form thereof.

Also, the present invention includes a case where, after program code read from a storage medium is written to a memory provided in a function expansion card which is inserted into the computer or in a function expansion unit that is connected to the computer, a CPU or the like provided in the function expansion card or the function expansion unit performs a part or the whole of a process according to instructions from the program code and implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-265513 filed Sep. 13, 2005, which is hereby incorporated by reference herein in its entirety.

What is claimed is:

1. A color conversion apparatus having a central processing unit, comprising:
    an acquiring unit configured to acquire sample point data indicating correspondence between device-dependent color data and device-independent color data;
    a generating unit configured to generate a lookup table from the acquired sample point data;
    a first color conversion unit configured to perform a linear interpolation process on input color data by using the generated lookup table to generate a first color conversion result;
    a calculating unit configured to calculate a coefficient from the acquired sample point data;
    a second color conversion unit configured to perform a nonlinear interpolation process on the input color data by using the calculated coefficient to generate a second color conversion result;
    a weighting unit configured to set a first weighting value and a second weighting value corresponding to the input color data; and
    a mixing unit operated by the central processing unit so as to (1) apply the first weighting value to the first color conversion result to obtain a first weighted color conversion result, (2) apply the second weighting value to the second color conversion result to obtain a second weighted color conversion result, and (3) sum the first and second weighted color conversion results.

2. The color conversion apparatus according to claim 1, wherein the weighting unit is further configured to generate a weighting table including weighting data corresponding to the acquired sample point data.

3. The color conversion apparatus according to claim 2, wherein the weighting unit is further configured to calculate the first and second weighting values by performing the linear interpolation process on the weighting data included in the weighting table.

4. The color conversion apparatus according to claim 1, wherein the second color conversion unit performs a multiple summation using piecewise polynomials as basis functions.

5. The color conversion apparatus according to claim 1, wherein the input color data comprises an R-value, a G-value, and a B-value.

6. A color conversion method executed by a color conversion apparatus having a central processing unit, the method comprising:
    acquiring sample point data indicating correspondence between device-dependent color data and device-independent color data;
    generating a lookup table from the acquired sample point data;
    generating a first interpolation result by performing a linear interpolation process on input color data by using the generated lookup table;
    calculating a coefficient from the acquired sample point data;
    generating a second interpolation result by performing a nonlinear interpolation process on the input color data by using the calculated coefficient;
    setting a first weighting value and a second weighting value corresponding to the input color data;
    applying a first weighting value to the first interpolation result to obtain a first weighted interpolation result;
    applying a second weighting value to the second interpolation result; and
    summing the first and second weighted interpolation results,
    wherein at least the steps of (1) applying the first weighting value, (2) applying the second weighting value and (3) summing the first and second weighted interpolation results are implemented by the central processing unit.

7. The color conversion method according to claim 6, wherein the nonlinear interpolation process performs a multiple summation using piecewise polynomials as basis functions.

8. The color conversion method according to claim 6, further comprising generating a weighting table including weighting data corresponding to the acquired sample point data.

9. The color conversion method according to claim 8, wherein the first and second weighting values are calculated by performing the linear interpolation process on the weighting data included in the weighting table.

10. The color conversion method according to claim 6, wherein the input color data comprises an R-value, a G-value, and a B-value.

11. A non-transitory computer-readable storage medium having stored thereon computer-executable instructions for causing a computer to implement a color conversion method, comprising:
- acquiring sample point data indicating correspondence between device-dependent color data and device-independent color data;
- generating a lookup table from the acquired sample point data;
- generating a first interpolation result by performing a linear interpolation process on input color data by using the generated lookup table;
- calculating a coefficient from the acquired sample point data;
- generating a second interpolation result by performing a nonlinear interpolation process on the input color data by using the calculated coefficient;
- setting a first weighting value and a second weighting value corresponding to the input color data;
- applying a first weighting value to the first interpolation result to obtain a first weighted interpolation result;
- applying a second weighting value to the second interpolation result; and
- summing the first and second weighted interpolation results,
wherein at least the steps of (1) applying the first weighting value, (2) applying the second weighting value and (3) summing the first and second weighted interpolation results are implemented by a central processing unit of the computer.

* * * * *